(12) United States Patent
Xie et al.

(10) Patent No.: US 11,663,136 B2
(45) Date of Patent: May 30, 2023

(54) STORAGE CAPACITY RECOVERY SOURCE SELECTION

(71) Applicant: Western Digital Technologies, Inc., San Jose, CA (US)

(72) Inventors: Hongmei Xie, Milpitas, CA (US); Dhanunjaya Rao Gorrle, Milpitas, CA (US); Aajna Karki, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 137 days.

(21) Appl. No.: 16/910,973

(22) Filed: Jun. 24, 2020

(65) Prior Publication Data

US 2021/0406192 A1 Dec. 30, 2021

(51) Int. Cl.
*G06F 12/10* (2016.01)
*G06F 12/02* (2006.01)

(52) U.S. Cl.
CPC .......... *G06F 12/10* (2013.01); *G06F 12/0253* (2013.01); *G06F 2212/1044* (2013.01)

(58) Field of Classification Search
CPC ......... G06F 12/0246; G06F 2212/7201; G06F 3/0679; G06F 2212/7208; G06F 3/061; G06F 2212/7205; G06F 2212/7203; G06F 3/0688; G06F 12/0253; G06F 12/10; G06F 3/0611; G06F 12/0292
USPC ... 711/103, E12.008, E12.001, E12.058, 202
See application file for complete search history.

(56) References Cited

U.S. PATENT DOCUMENTS

| | | | |
|---|---|---|---|
| 10,762,001 B2 * | 9/2020 | Park | G06F 12/126 |
| 2014/0115238 A1 * | 4/2014 | Xi | G06F 12/12 711/159 |
| 2017/0371559 A1 * | 12/2017 | Higgins | G06F 12/0871 |
| 2020/0057562 A1 * | 2/2020 | Lee | G06F 12/0246 |

* cited by examiner

*Primary Examiner* — Gautam Sain
*Assistant Examiner* — Edward Waddy, Jr.
(74) *Attorney, Agent, or Firm* — Kunzler Bean & Adamson

(57) ABSTRACT

A non-volatile memory device includes a volatile memory, a non-volatile memory, and a controller. The controller is configured to map logical addresses for stored data to physical addresses of the stored data in the non-volatile memory using a logical-to-physical mapping structure stored partially in the volatile memory and at least partially in the non-volatile memory. The controller is configured to perform a storage capacity recovery operation for a region of the non-volatile memory that is selected based at least partially on a number of mappings for the region likely to be stored in the volatile memory for the storage capacity recovery operation.

19 Claims, 8 Drawing Sheets

STORAGE CAPACITY RECOVERY SOURCE SELECTION

TECHNICAL FIELD

The present disclosure, in various embodiments, relates to storage capacity recovery for non-volatile memory and more particularly relates to selection of a source block for a storage capacity recovery operation.

BACKGROUND

To ensure data integrity, data stored in non-volatile memory devices may be moved to a new location, sometimes undergoing error correction in the process. In systems using logical-to-physical mappings, a mapping structure may be traversed to determine what data is valid and what data can be left behind and erased when the valid data is moved. Traversing a logical-to-physical mapping structure to determine valid data can be a time consuming process, especially if the mapping structure is stored in multiple locations, and/or in non-volatile memory, slowing operation of the non-volatile memory device.

SUMMARY

Systems are presented for source selection for storage capacity recovery. In one embodiment, a non-volatile memory device includes a volatile memory, a non-volatile memory, and a controller. The controller, in certain embodiments, is configured to map logical addresses for stored data to physical addresses of the stored data in the non-volatile memory using a logical-to-physical mapping structure stored partially in volatile memory and at least partially in the non-volatile memory. In a further embodiment, the controller is configured to perform a storage capacity recovery operation for a region of the non-volatile memory that is selected based at least partially on a number of mappings for the region that are likely to be stored in volatile memory for the storage capacity recovery operation.

Apparatuses are presented for source selection for storage capacity recovery. In one embodiment, a mapping module is configured to map logical addresses for stored data to physical addresses of the stored data in a non-volatile memory using a logical-to-physical mapping structure stored partially in volatile memory and at least partially in the non-volatile memory. A hit count module, in some embodiments, is configured to track, per block of a non-volatile memory, a hit count estimating a number of mappings of a logical-to-physical mapping structure likely to be stored in volatile memory for a garbage collection operation. A garbage collection module, in certain embodiments, is configured to perform a garbage collection operation for one or more blocks of the non-volatile memory selected based at least partially on a hit count for the one or more blocks.

Other apparatuses are presented for source selection for storage capacity recovery. In one embodiment, an apparatus includes means for paging logical-to-physical mappings from a volatile memory to a non-volatile memory. An apparatus, in a further embodiment, includes means for ranking blocks of the non-volatile memory at least partially based on how many logical-to-physical mappings for the blocks are likely to be stored in volatile memory. In some embodiments, an apparatus includes means for performing a storage capacity recovery operation on a block of the non-volatile memory selected based at least partially on a ranking of blocks.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which.

DETAILED DESCRIPTION

Figure 1:
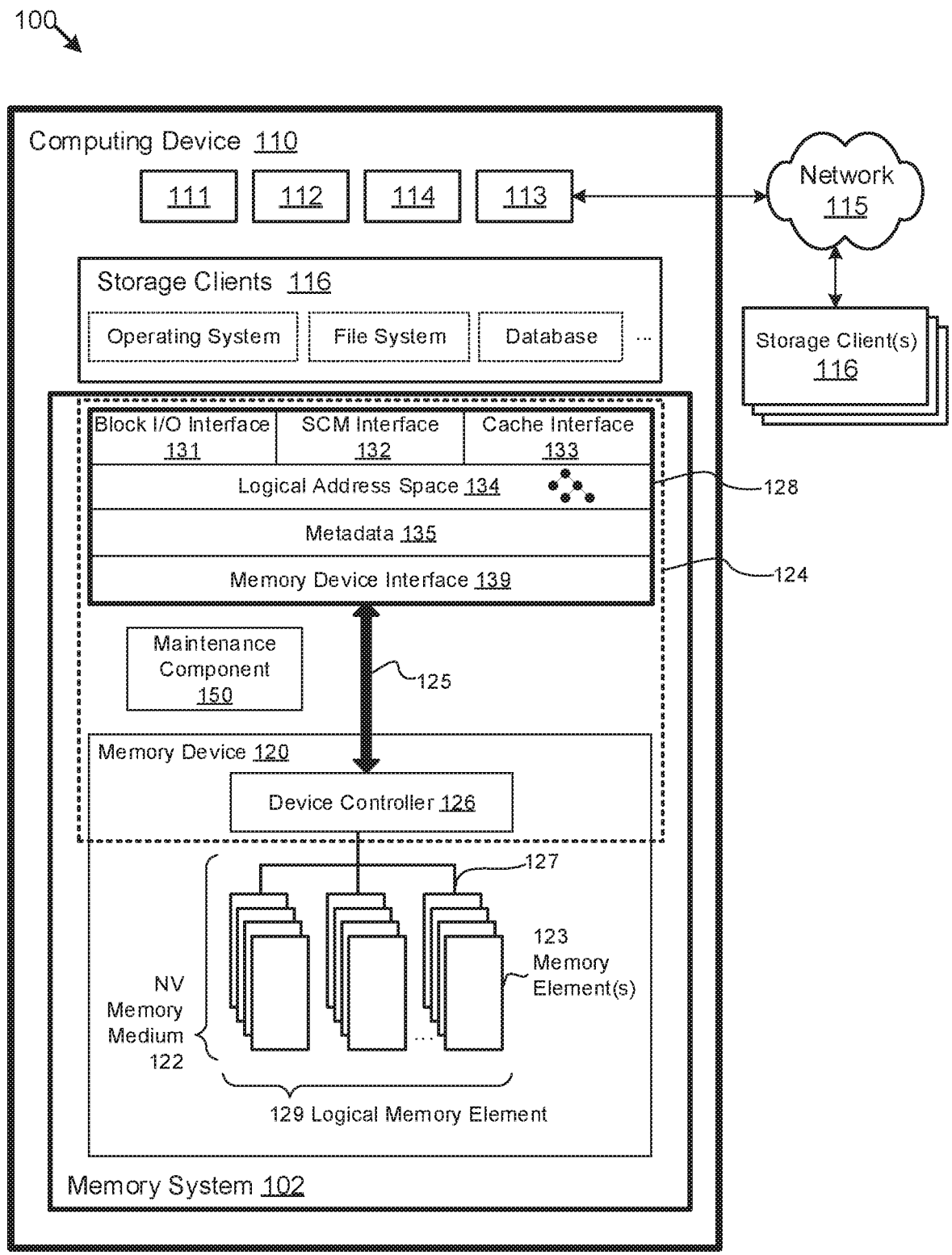
FIG. 1 is a schematic block diagram of one embodiment of a system for source selection for storage capacity recovery.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer readable storage media storing computer readable and/or executable program code.

Many of the functional units described in this specification have been labeled as modules, in order to more particularly emphasize their implementation independence. For example, a module may be implemented as a hardware circuit comprising custom VLSI circuits or ASICs, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer readable and/or executable storage media. Any combination of one or more computer readable storage media may be utilized. A computer readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, ASICs, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, ASICs, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure are described below with reference to flowcharts and/or schematic block diagrams of methods, apparatuses, systems, and computer program products according to embodiments of the disclosure. It will be understood that each block of the flowcharts and/or schematic block diagrams, and combinations of blocks in the flowcharts and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the flowcharts and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

FIG. 1 is a block diagram of one embodiment of a system 100 for storage capacity recovery. The system 100 comprises one or more maintenance components 150 for a non-volatile memory device 120. A maintenance component 150 may be part of a non-volatile memory device controller 126 disposed on a non-volatile memory device 120, part of a device driver 128 disposed on a host computing device 110, and/or part of a non-volatile memory element 123, and/or may be in communication with a non-volatile memory device controller 126, a device driver 128, or the like.

In some embodiments, a maintenance component 150 may at least partially operate on and/or in communication with a non-volatile memory system 102 of a host computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 and/or memory device controller 126 to a communication network 115, such as an Internet Protocol (IP) network, a Storage Area Network (SAN), wireless network, wired network, or the like.

The memory device 120, in various embodiments, may be disposed in one or more different locations relative to the computing device 110. In one embodiment, the memory device 120 comprises one or more non-volatile memory elements 123, such as semiconductor chips, dies, and/or packages or other integrated circuit devices disposed on one or more printed circuit boards, storage housings, and/or other mechanical and/or electrical support structures. For example, the memory device 120 may comprise one or more direct inline memory module (DIMM) cards, one or more expansion cards and/or daughter cards, a memory card, a universal serial bus (USB) drive, a solid-state-drive (SSD) or other hard drive device, and/or may have another memory and/or storage form factor. The memory device 120 may be integrated with and/or mounted on a motherboard of the computing device 110, installed in a port and/or slot of the computing device 110, installed on a different computing device 110 and/or a dedicated storage appliance on the network 115, in communication with the computing device 110 over an external bus (e.g., an external hard drive), or the like.

The memory device 120, in one embodiment, may be coupled to a memory bus of a processor 111 (e.g., on the same memory bus as the volatile memory 112, on a different memory bus from the volatile memory 112, in place of the volatile memory 112, or the like). In a further embodiment, the memory device 120 may be coupled to a peripheral bus of the computing device 110, such as a peripheral component interconnect express (PCI Express or PCIe) bus, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the memory device 120 may be disposed on a data network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The computing device 110 may further comprise a non-transitory, computer readable storage medium 114 (e.g., comprising and/or in addition to the non-volatile memory elements 123). The computer readable storage medium 114 may comprise executable instructions configured to cause the computing device 110 (e.g., processor 111) to perform steps of one or more of the methods disclosed herein. Alternatively, or in addition, the maintenance component 150 may include one or more computer readable instructions stored on the non-transitory storage medium 114.

The non-volatile memory system 102, in the depicted embodiment, includes one or more maintenance components 150. In certain embodiments, as described in greater detail below, a maintenance component 150 may be configured to perform one or more storage capacity recovery operations (e.g., garbage collection) and/or other memory maintenance operations on one or more memory elements 123. A maintenance component 150, in some embodiments, selects a block or other region of a non-volatile memory element 123 for which to perform a storage capacity recovery operation (e.g., garbage collection) based at least partially on a number of logical-to-physical mappings for the block or other region that are likely to be stored in volatile memory (e.g., volatile memory 112 of the host computing device 110, volatile memory of the non-volatile memory device controller 126 on the non-volatile memory device 120, or the like) for a storage capacity recovery operation, rather than being paged or otherwise stored in a non-volatile memory 122 (which may take longer to access than volatile memory). By selecting blocks for garbage collection at least partially based on how many mappings for the blocks are stored in volatile memory (e.g., a cache hit rate for a logical-to-physical mapping structure or the like), in certain embodiments, the maintenance component 150 may expedite and/or increase performance of the garbage collection, compared to a selection based solely on an amount of valid data in the blocks, which may increase performance and/or decrease latency for other operations on the non-volatile memory device 120

A storage capacity recovery operation and/or another maintenance operation may comprise a management and/or system operation for a non-volatile memory 122 (e.g., that is not in response to a read and/or write request from a storage client 116 or the like). For example, in various embodiments, a storage capacity recovery operation may comprise a garbage collection operation (e.g., writing data from one block or other region to another and clearing the data from the old block or other region for reuse), a wear leveling operation (e.g., moving and/or logically remapping a block of other region), otherwise moving data from one block or other region of memory to another, or the like.

In some embodiments, a storage capacity recovery operation comprises one or more operations for writing data previously stored by a non-volatile memory 122 back to the same non-volatile memory 122 (e.g., to a different location/region, to the same location/region, or the like). For example, a storage capacity recovery operation may rewrite data to prevent data loss and/or corruption, to rotate data, or the like. A storage capacity recovery operation may be part of and/or include a garbage collection operation to move valid data to a different block or other region of memory to recover storage capacity used by invalid data, to correct data errors using on or off-chip error correction, or the like. In some embodiments, a maintenance component 150 may perform a storage capacity recovery operation in response to an error metric satisfying an error threshold, in response to a temperature satisfying a temperature threshold, periodically in response to a time threshold, in response to read disturb effects satisfying a read disturb threshold, in response to write disturb effects satisfying predefined write disturb threshold, or the like.

A region of memory may comprise a group of memory cells, such as a block (e.g., a logical block, a physical block, an erase block, a garbage collection block, and/or another block of predefined size), a memory element 123, an error correcting code (ECC) codeword, a page, a word line, a bit line, a chip, a die, a die plane, or the like. The maintenance component 150, in certain embodiments, may perform storage capacity recovery operations, such as garbage collection, wear leveling, or the like, on one or more regions of memory at a time (e.g., selecting a block or other region for each operation, or the like).

In one embodiment, a maintenance component 150 may comprise logic circuitry of a memory device controller 126 and/or of a non-volatile memory element 123, other programmable logic, firmware for a memory device controller 126 and/or a non-volatile memory element 123, microcode for execution by a memory device controller 126 and/or non-volatile memory element 123, or the like. In some embodiments, a maintenance component 150 may comprise executable software code, stored on a computer readable storage medium for execution by logic hardware of a memory device controller 126, of a non-volatile memory element 123, of a host computing device 110 (e.g., as a device driver 128 executing on a processor 111 or the like), and/or by another processor 111 or other logic circuitry. In a further embodiment, a maintenance component 150 may include a combination of both executable software code and logic circuitry.

In one embodiment, the maintenance component 150 may be part of and/or may be configured to receive storage requests and/or commands from a memory controller 124, a processor 111, a device driver 128 or other executable application via buses 125, 127, a memory device controller 126, or the like. The maintenance component 150 may be further configured to transfer data to/from a memory controller 124, a device driver 128 and/or storage client 116, or the like via the bus 125. Accordingly, a maintenance component 150, in some embodiments, may comprise and/or be in communication with one or more direct memory access (DMA) modules, remote DMA modules, bus controllers, bridges, buffers, or the like to facilitate the transfer of storage requests and/or associated data. In another embodiment, a maintenance component 150 may receive storage requests and/or refresh commands as an API call from a storage client 116, as an IO-CTL command, or the like.

In one embodiment, a maintenance component 150 is disposed on a memory device controller 126 or other interposer between a host device 110 and/or processor 111 and a memory element 123, and receives commands for the memory element 123 on the memory device controller 126 or another interposer. In another embodiment, a maintenance component 150 is integrated on a memory element 123 (e.g., an on-die controller, a state machine, and/or other logic hardware or executable code) and receives commands directly from a host device 110 and/or processor 111 without an interposer therebetween. In other embodiments, a portion of a maintenance component 150 may be disposed on a memory device controller 126 or other interposer and a portion of a maintenance component 150 may be disposed on a memory element 123.

According to various embodiments, a memory device controller 126 may manage one or more memory devices 120 and/or memory elements 123. The memory device(s) 120 may comprise recording, memory, and/or storage devices, such as solid-state storage device(s) and/or semiconductor storage device(s) that are arranged and/or partitioned into a plurality of addressable media storage locations or other regions. A media storage location and/or region, in certain embodiments, refers to any physical unit of memory (e.g., any quantity of physical storage media on a memory device 120). Memory units and/or regions may include, but are not limited to pages, memory divisions, blocks, sectors, collections or sets of physical storage locations (e.g., logical pages, logical blocks), or the like.

A device driver 128 and/or the memory device controller 126, in certain embodiments, may present a logical address space 134 to the storage clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver 128 for the memory device 120 may maintain metadata 135, such as a logical-to-physical mapping structure, to map logical addresses of the logical address space 134 to media storage locations on the memory device(s) 120. A device driver 128 may be configured to provide storage services to one or more storage clients 116. The storage clients 116 may include local storage clients 116 operating on the computing device 110 and/or remote, storage clients 116 accessible via the network 115 and/or network interface 113. The storage clients 116 may include, but are not limited to: operating systems, file systems, database applications, server applications, kernel-level processes, user-level processes, applications, and the like.

A device driver 128 may be communicatively coupled to one or more memory devices 120. The one or more memory devices 120 may include different types of memory devices including, but not limited to: solid-state storage devices, semiconductor storage devices, SAN storage resources, volatile memory devices, non-volatile memory devices, or the like. The one or more memory devices 120 may comprise one or more respective memory controllers 126 and memory elements 123. A device driver 128 may provide access to the one or more memory devices 120 via a traditional block I/O interface 131. Additionally, a device driver 128 may provide access to enhanced functionality through the SCM interface 132. The metadata 135 may be used to manage and/or track data operations performed through any of the Block I/O interface 131, SCM interface 132, cache interface 133, or other, related interfaces.

The cache interface 133 may expose cache-specific features accessible via a device driver 128 for the memory device 120. Also, in some embodiments, the SCM interface 132 presented to the storage clients 116 provides access to data transformations implemented by the one or more memory devices 120 and/or the one or more memory controllers 126.

A device driver 128 may present a logical address space 134 to the storage clients 116 through one or more interfaces. As discussed above, the logical address space 134 may comprise a plurality of logical addresses, each corresponding to respective media locations the on one or more memory devices 120. A device driver 128 may maintain metadata 135 comprising any-to-any mappings between logical addresses and media locations, or the like.

A device driver 128 may further comprise and/or be in communication with a memory device interface 139 configured to transfer data, commands, and/or queries to the one or more memory devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The memory device interface 139 may communicate with the one or more memory devices 120 using input-output control (IO-CTL) command(s), IO-CTL command extension(s), remote direct memory access, or the like.

The communication interface 113 may comprise one or more network interfaces configured to communicatively couple the computing device 110 and/or the memory device controller 126 to a network 115 and/or to one or more remote, network-accessible storage clients 116. The storage clients 116 may include local storage clients 116 operating on the computing device 110 and/or remote, storage clients 116 accessible via the network 115 and/or the network interface 113. The memory device controller 126 is part of and/or in communication with one or more memory devices 120. Although FIG. 1 depicts a single memory device 120, the disclosure is not limited in this regard and could be adapted to incorporate any number of memory devices 120, a combination of one or more volatile memory devices 120 and one or more non-volatile memory devices 120, or the like.

In some embodiments, a non-volatile memory element 123 may comprise and/or be part of a non-volatile memory device 120 for storing data using an array of vertical, three-dimensional (3D) memory structures, in an array of two-dimensional (2D) memory structures, or the like. For example, the system 100 may comprise one or more non-volatile memory elements 123, such as one or more chips, packages, dies, die planes, and/or other integrated circuit memory devices 120 (e.g., one or more monolithic, three-dimensional memory devices; semiconductor devices; and/ or other solid-state devices) comprising a non-volatile memory medium 122.

The memory device 120 may comprise one or more elements 123 of memory 122. In one embodiment, an element 123 of memory 122 comprises a volatile memory, such as random access memory (RAM), dynamic RAM (DRAM), synchronous DRAM (SDRAM), double data rate (DDR) SDRAM, static RAM (SRAM), thyristor RAM (T-RAM), zero-capacitor RAM (Z-RAM), or the like. In certain embodiments, an element 123 of memory 122 comprises a non-volatile memory, such as NAND flash memory (e.g., 2D NAND flash memory, 3D NAND flash memory), NOR flash memory, ReRAM, Memristor memory, programmable metallization cell memory, phase-change memory (PCM, PCME, PRAM, PCRAM, ovonic unified memory, chalcogenide RAM, or C-RAM), nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like.

While the non-volatile memory 122 is referred to herein as "memory," in various embodiments, the non-volatile memory 122 may more generally comprise one or more non-volatile recording media capable of recording data, which may be referred to as a non-volatile memory, a non-volatile storage medium, or the like. Further, the non-volatile memory device 120, in various embodiments, may comprise a non-volatile recording device, a non-volatile memory device, a non-volatile storage device, or the like. Similarly, a non-volatile memory element 123, in various embodiments, may comprise a non-volatile recording element, a non-volatile memory element, a non-volatile storage element, or the like.

The non-volatile memory 122 may comprise one or more non-volatile memory elements 123, which may include, but are not limited to: chips, packages, planes, die, or the like. A non-volatile memory device controller 126 may be configured to manage data operations on the memory 122, and may comprise one or more processors, programmable processors (e.g., FPGAs), ASICs, micro-controllers, or the like. In some embodiments, the memory device controller 126 is configured to store data on and/or read data from the memory 122, to transfer data to/from the non-volatile memory device 120, and so on.

The memory device controller 126 may be communicatively coupled to the memory 122 by way of a bus 127. The bus 127 may comprise an I/O bus for communicating data to/from the memory elements 123. The bus 127 may further comprise a control bus for communicating addressing and other command and control information to the memory elements 123. In some embodiments, the bus 127 may communicatively couple the memory elements 123 to the memory device controller 126 in parallel. This parallel access may allow the memory elements 123 to be managed as a group, forming a logical memory element 129. The logical memory element 129 may be partitioned into respective logical memory units (e.g., logical pages) and/or logical memory divisions (e.g., logical blocks). The logical memory units may be formed by logically combining physical memory units of each of the non-volatile memory elements 123.

The device controller 126 may comprise and/or be in communication with a device driver 128 executing on the computing device 110. A device driver 128 may provide storage services to the storage clients 116 via one or more interfaces 131, 132, and/or 133. In some embodiments, a device driver 128 provides a block-device I/O interface 131 through which storage clients 116 perform block-level I/O operations. Alternatively, or in addition, a device driver 128 may provide a storage class memory (SCM) interface 132, which may provide other storage services to the storage clients 116. In some embodiments, the SCM interface 132 may comprise extensions to the block device interface 131 (e.g., storage clients 116 may access the SCM interface 132 through extensions or additions to the block device interface 131). Alternatively, or in addition, the SCM interface 132 may be provided as a separate API, service, and/or library. A device driver 128 may be further configured to provide a cache interface 133 for caching data using the non-volatile memory system 102. A device driver 128 may further comprise a non-volatile memory device interface 139 that is configured to transfer data, commands, and/or queries to the memory device controller 126 over a bus 125, as described above.

Figure 2:
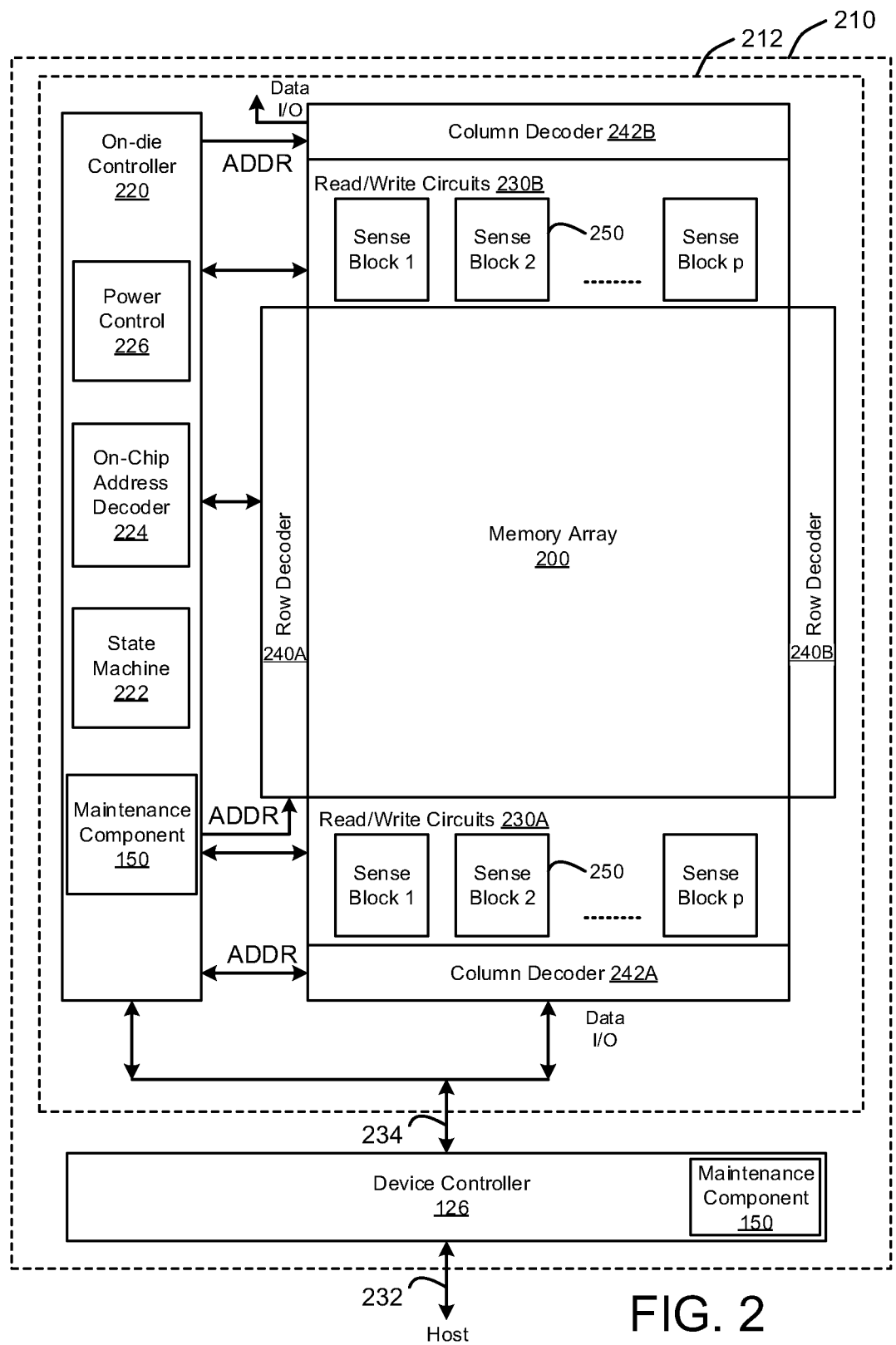
FIG. 2 is a schematic block diagram illustrating a further embodiment of a system for source selection for storage capacity recovery.

FIG. 2 illustrates an embodiment of a non-volatile storage device 210 that may include one or more memory die or chips 212. The nonvolatile storage device 210 may be substantially similar to the nonvolatile memory device 120 described with reference to FIG. 1. Memory die 212, in some embodiments, includes an array (two-dimensional or three dimensional) of memory array 200, die controller 220, and read/write circuits 230A/230B. In one embodiment, access to the memory array 200 by the various peripheral circuits is implemented in a symmetric fashion, on opposite sides of the array, so that the densities of access lines and circuitry on each side are reduced by half. The read/write circuits 230A/230B, in a further embodiment, include multiple sense blocks 250 which allow a page of memory cells to be read or programmed in parallel.

The memory array 200, in various embodiments, may be addressable by word lines via row decoders 240A/240B and by bit lines via column decoders 242A/242B. In some embodiments, a controller 126 is included in the same memory device 210 (e.g., a removable storage card or package) as the one or more memory die 212. Commands and data are transferred between the host and controller 126 via lines 232 and between the controller and the one or more memory die 212 via lines 234. One implementation can include multiple chips 212.

A die controller 220, in one embodiment, cooperates with the read/write circuits 230A/230B to perform memory operations on the memory array 200. One or more of the die controller 220 and/or the memory device controller 126, in certain embodiments, may include a maintenance component 150, a state machine 222, an on-chip address decoder 224, and a power control circuit 226. The maintenance component 150, in one embodiment, is configured to perform one or more storage capacity recovery operations and/or other memory maintenance operations on a region of the memory array 200, based at least partially on how many logical-to-physical address mappings for the region are stored in volatile memory.

The state machine 222, in one embodiment, provides chip-level control of memory operations. The on-chip address decoder 224 provides an address interface to convert between the address that is used by the host or a memory controller 124 to the hardware address used by the decoders 240A, 240B, 242A, 242B. The power control circuit 226 controls the power and voltages supplied to the word lines and bit lines during memory operations. In one embodiment, power control circuit 226 includes one or more charge pumps that can create voltages larger than the supply voltage.

In certain embodiments, the state machine 222 includes at least a portion of the maintenance component 150. The maintenance component 150, in certain embodiments, may include software, firmware, and/or logic hardware of a die controller 220, a state machine 222, and/or a non-volatile memory device controller 126.

In one embodiment, one or any combination of die controller 220, device controller 126, maintenance component 150, power control circuit 226, decoder circuit 224, state machine circuit 222, decoder circuit 242A, decoder circuit 242B, decoder circuit 240A, decoder circuit 240B, read/write circuits 230A, read/write circuits 230B, and/or device controller 126 may be referred to as one or more managing circuits.

Figure 3:
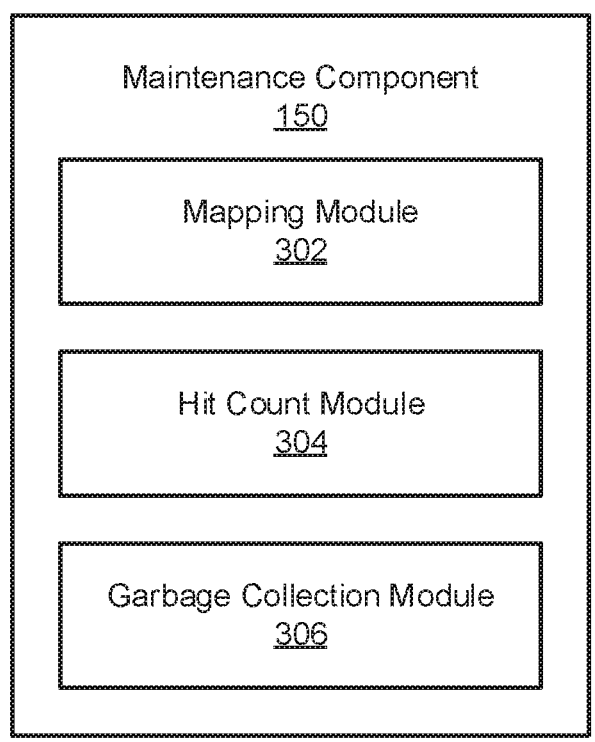
FIG. 3 is a schematic block diagram illustrating one embodiment of a maintenance component.

FIG. 3 depicts one embodiment of a maintenance component 150. The maintenance component 150, in certain embodiments, may be substantially similar to one or more of the maintenance component 150 described above with regard to FIG. 1 and/or the maintenance component 150 described above with regard to FIG. 2.

In the depicted embodiment, the maintenance component 150 includes a mapping module 302, a hit count module 304, and a garbage collection module 306. The mapping module 302, the hit count module 304, and/or the garbage collection module 306, in various embodiments, may comprise logic hardware and/or executable program code stored by a non-transitory computer readable storage medium, or the like.

In one embodiment, the mapping module 302 is configured to map logical addresses for stored data to physical addresses of the stored data in the memory 122 using a logical-to-physical mapping structure (e.g., metadata 135 for the logical address space 134), which may be stored partially in volatile memory (e.g., volatile memory of the device controller 126, volatile memory 112 of the host computing device 110, or the like) and at least partially stored in the memory 122, or the like. For example, the logical-to-physical mapping structure may be too large to fit solely in the volatile memory, and the mapping module 302 may store at least part of the logical-to-physical mapping structure in the memory 122 (e.g., a least recently used portion, a least frequently used portion, or the like).

Figure 4:
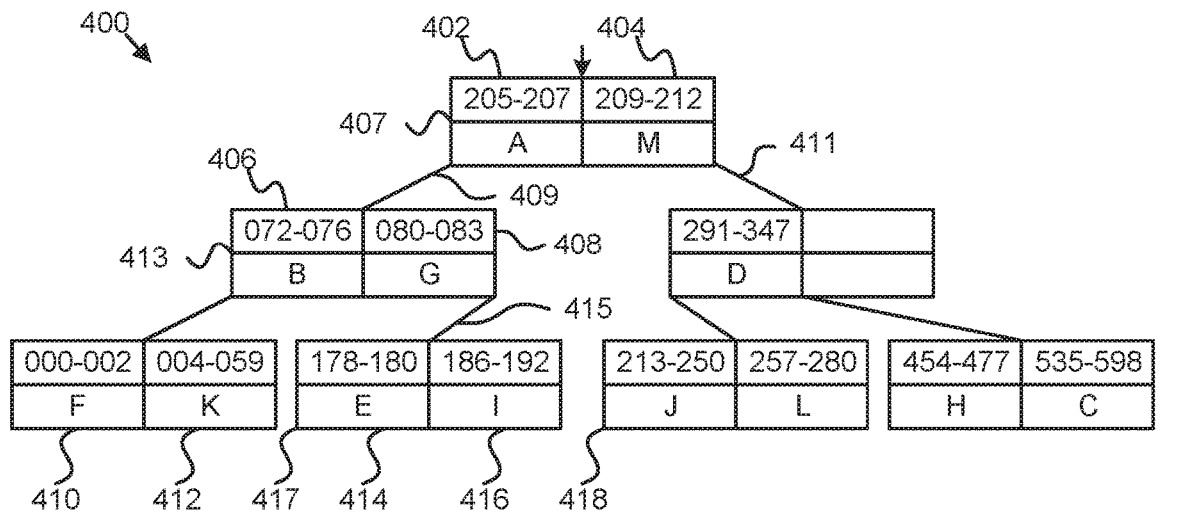
FIG. 4 is a schematic block diagram illustrating embodiments of a logical-to-physical mapping structure, a logical address space, and a log-based writing structure.
Figure 4:
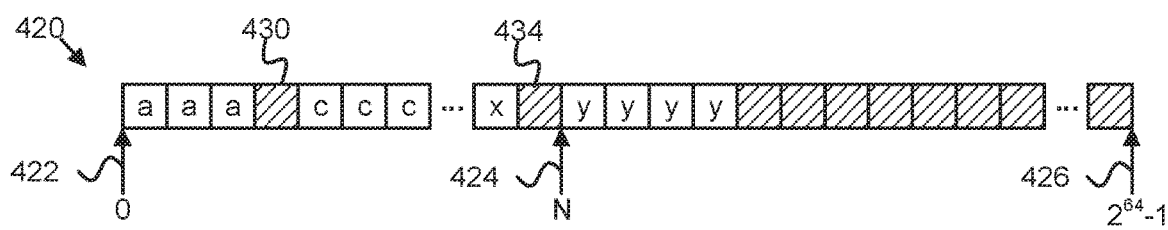
Figure 4:
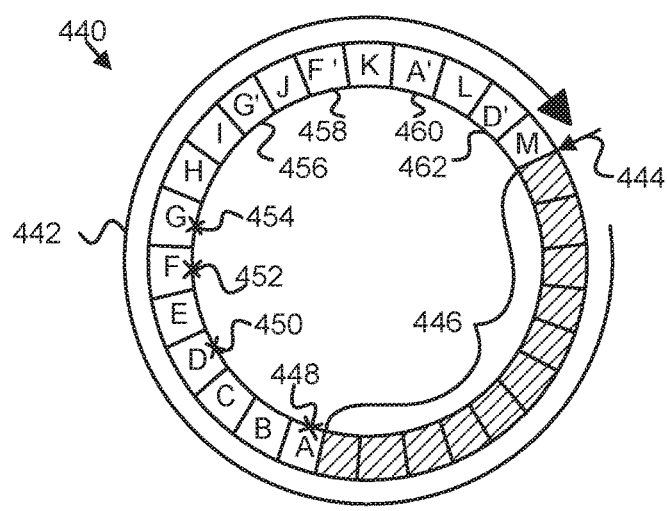

A logical-to-physical mapping structure, as used herein, comprises a data structure that maps logical memory addresses to physical memory locations (e.g., physical memory addresses, physical memory addresses and lengths and/or offsets, or the like). A logical-to-physical mapping structure, in various embodiments, may include a mapping table, B-tree, B*-tree, B+-tree, content addressable memory (CAM), binary tree, hash table, index, array, linked-list, look-up table (LUT), and/or another mapping data structure. One example of a logical-to-physical mapping structure 400 is depicted in FIG. 4 and described in greater detail below.

Entries in the logical-to-physical mapping structure may map and/or translate a logical address to a physical address. For example, an entry may comprise a logical block address (LBA) and physical block address (PBA) pair, or the like. As described in greater detail below with regard to the hit count module 304, in certain embodiments, the mapping module 302 may store other metadata in the logical-to-physical mapping structure (e.g., indicating which data is valid, a valid count, a hit count indicating how much data of a block or other region is stored in volatile memory, and/or other metadata). In other embodiments, the hit count module 304 may store metadata elsewhere (e.g., in a block header and/or footer for a block in the memory 122 and/or in another predefined location).

As more data is written over time, a size of the logical-to-physical mapping structure may increase. Especially in non-volatile memory devices 120 with higher capacities, or lower amounts of volatile memory (e.g., budget devices), the logical-to-physical mapping structure may outgrow available volatile memory, and the mapping module 302 may page, evict, and/or otherwise remove a portion of the logical-to-physical mapping structure from volatile memory, such that the portion is only stored in the memory 122. In response to data being requested, a mapping for which is no longer in volatile memory (e.g., a cache miss), the mapping module 302 may read out the associated mapping (e.g., a mapping page, partial tree, partial mapping table, or the like) from the memory 122 back into volatile memory for satisfying the request.

In certain embodiments, the mapping module 302 may use the volatile memory as a cache, storing a most recently used portion, a most frequently used portion, or the like of the logical-to-physical mapping structure in the volatile memory and storing the entire logical-to-physical mapping structure in the memory 122. The mapping module 302 may periodically snapshot, checkpoint, and/or destage new and/or updated portions of the logical-to-physical mapping structure from the volatile memory to the non-volatile memory 122.

In some embodiments, the mapping module 302 may organize the logical-to-physical mapping structure into pages and/or other discrete portions (e.g., a mapping page, a partial tree, a partial mapping table, or the like), so that the mapping module 302 may store part of the logical-to-physical mapping structure in volatile memory and part of the logical-to-physical mapping structure in the memory 122.

In one embodiment, the hit count module 304 is configured to track (e.g., determine, estimate, tally, count, or the like), a hit count indicating an estimate of a number of mappings of the logical-to-physical mapping structure likely to be stored in volatile memory (e.g., volatile memory of the device controller 126 on the non-volatile memory device 120, volatile memory 112 of the host computing device 110, or the like) for a garbage collection operation or other storage capacity recovery operation. The hit count module 304 may track (e.g., determine, estimate, sum, or the like) a number of mappings per block or other region of the memory 122 likely to be stored in volatile memory, may rank and/or group blocks or other regions based at least partially on a tracked number of mappings for the blocks or other regions in the volatile memory, based on an amount of valid data in the blocks or other regions, or the like. For example, in certain embodiments, the hit count module 304 may store hit counts as an integer counter per block or other region (e.g., per garbage collection block) in a predefined location, in the block or other region itself, in volatile memory, with other metadata, or the like.

The hit count module 304, in some embodiments, may also track (e.g., determine, estimate, tally, count, or the like) a valid count indicating an amount of valid data in a block or other region of the memory 122. For example, a valid count may indicate how much data is valid (e.g., has not yet been invalided by a subsequent write to the same logical address), without indicating which specific data is valid. In certain embodiments, the hit count module 304 may store valid counts as an integer counter per block or other region (e.g., per garbage collection block) in a predefined location, in the block or other region itself, in volatile memory, with other metadata, or the like. As described in greater detail below, the garbage collection module 306, in various embodiments, may select a block and/or another region of the memory 122 for a storage capacity recovery operation based at least partially on a hit count and/or a valid count.

In certain embodiments, the hit count module 304 may rank blocks or other regions of the memory 122 based on hit count (e.g., an estimated number of mappings of the logical-to-physical mapping structure likely to be stored in volatile memory) and/or valid count (e.g., how much data is valid). For example, the hit count module 304 may rank blocks or other regions by the highest number of mappings likely to be stored in the volatile memory out of blocks or other regions having a lowest amount of valid data, by the lowest amount of valid data out of a group of blocks or other regions selected as having both less than a threshold amount of valid data and more than a threshold number of mappings likely to be stored in the volatile memory, by highest number of mappings likely to be stored in the volatile memory out of a group of blocks or other regions selected as having both less than a threshold amount of valid data and more than a threshold number of mappings likely to be stored in the volatile memory, by highest number of mappings likely to be stored in the volatile memory out of a largest group of blocks or other regions having an amount of valid data within a predetermined valid data range of each other, and/or by another ranking based on hit count and/or valid count. As described below, in some embodiments, the garbage collection module 306 may select a block or other region for garbage collection and/or another storage capacity recovery operation based on a ranking provided by the hit count module 304, or the like.

The hit count module 304, in one embodiment, determines a rolling and/or cumulative estimate of a hit count for a block or other region (e.g., a number of logical-to-physical mappings for the block or other region that are likely to be stored in volatile memory) as data is written to the block or other region. A write request may be for a successive logical block address (LBA) range (e.g., defined by a starting LBA and a number of logical blocks, or the like). In response to a write request or other write command (e.g., for a storage client 116 or the like), the hit count module 304 may determine how many mapping pages or other portions of a logical-to-physical mapping structure will be used to map the data, based on a length of the associated data of the like.

For example, if a starting LBA for a write request is zero, and the number of logical blocks is six, and each mapping page stores four mappings (by way of example only), mappings for the write request will be stored in two mapping pages. If the data is written to the same block or other region (e.g., a garbage collection block or the like), a storage capacity recovery operation such as garbage collection for the data of the write request may have two cache misses (e.g., two mapping pages not stored in volatile memory) since the data is only mapped by two mapping pages of the logical-to-physical mapping structure.

The hit count module 304 may use a per command estimation (e.g., per write request) of a hit count for each block or other region of the non-volatile memory 122 (e.g., for each garbage collection block, or the like), summing the per command estimations for each write command for the block or other region until it's full. The hit count module 304 may determine an estimated hit count by subtracting the estimated worst case cache misses for a block or other region from the total number of logical block addresses for the block or other region. For example, in certain embodiments, the hit count module 304 may determine a hit count for a command, $HC_{cmd}$ using Equation 1 below, or the like.

$$HC_{cmd} = NLB_{cmd} - \lceil NLB_{cmd}/NLBA_{MP} \rceil \quad \text{(Equation 1)}$$

In Equation 1, the hit count for a command, $HC_{cmd}$, is determined based on the number of logical blocks for the associated command, $NLB_{cmd}$, from which the ceiling of $NLB_{cmd}$ divided by the number of logical block addresses per mapping page or other portion of a logical-to-physical mapping structure $NLBA_{MP}$. Once a block or other region (e.g., a garbage collection block, or the like) is full, the hit count module 304 may sum each of the command hit counts $HC_{cmd}$ for the block, to determine a hit count for the entire block, $HC_{GCB}$, using Equation 2, for example.

$$HC_{GCB} = \Sigma_{cmd} HC_{cmd} \quad \text{(Equation 2)}$$

In some embodiments, the hit count module 304 determines that a write request will overlap multiple blocks or other regions of the non-volatile memory 122, and attributes appropriate portions of the hit count for the command to the different blocks or other regions. Determining a hit count using a per-command determination such as Equation 1 may underestimate the actual hit rate, since the determination is worst case, assuming that none of the mappings are already stored in volatile memory. However, since a portion of a logical-to-physical mapping structure (e.g., a mapping page) may store entries for multiple write requests, so certain mappings may already be stored in volatile memory.

In further embodiments, in consideration of the above, the hit count module 304 may determine a hit count per portion of the logical-to-physical mapping structure (e.g., per mapping page) rather than per command. For example, the hit count module 304 may use a sliding window to reduce the number of counters used by the hit count module 304 to determine a hit count, while still accounting for the case when the same portion of the logical-to-physical mapping structure (e.g., the same mapping page) is revisited with mappings for the same block or other region of the non-volatile memory 122 (e.g., and may therefore already be in volatile memory, or the like).

In one embodiment, the garbage collection module 306 is configured to perform a storage capacity recovery operation, such as a garbage collection operation, for one or more blocks or other regions of the non-volatile memory 122. The garbage collection module 306 may select a block or other region (e.g., a garbage collection block, a source block, or the like) for the storage capacity recovery operation based at least partially on a hit count (e.g., an estimated number of mappings of the logical-to-physical-mapping structure for the block or other region likely to be stored in volatile memory, estimated by the hit count module 304 as described above, or the like). For example, in some embodiments, the garbage collection module 306 may select a block or other region that has a highest hit count (e.g., a highest number of mappings likely to be in volatile memory during a storage capacity recovery operation, or the like).

The garbage collection module 306, in certain embodiments, as part of a garbage collection operation or other storage capacity recovery operation, may write valid data from a selected block or other region to a different block or other region, erasing and/or otherwise clearing the selected block or other region for reuse storing new data. In order to determine which data of a selected block is valid, the garbage collection module 306 may scan logical addresses of the selected block, checking mapping entries for the logical addresses in the logical-to-physical mapping structure to determine if the mapping entries still map the logical addresses to physical addresses in the selected block (e.g., indicating that the data is valid), or if they have been invalidated by subsequent writes and the mapping entries point to a different block.

Because, in some embodiments, the garbage collection module 306 uses the logical-to-physical mapping structure to determine which data is valid, the garbage collection module 306 may perform a storage capacity recovery operation faster for blocks or other regions with higher hit counts. For example, for blocks with higher hit counts, fewer mapping pages may be read from the non-volatile memory 122 into volatile memory in order to complete the storage capacity recovery operation.

To reduce write amplifications while also optimizing by hit count, in one embodiment, the garbage collection module 306 may select a block or other region based both on hit count and on a size or amount of valid data from the block or other region. As described above, in some embodiments the hit count module 304 may track and/or otherwise determine or estimate a valid count indicating a size or amount of valid data per block or other region, in addition to tracking a hit count, and may provide one or more rankings of blocks or other regions based on hit count and/or valid count. The garbage collection module 306 may select a block or other region for garbage collection or other storage capacity recovery operation based on a ranking or other grouping by the hit count module 304.

For example, the hit count module 304 and/or the garbage collection module 306 may rank and/or group blocks or other region by a valid count and/or a hit count, to facilitate selection for storage capacity recovery operations. Periodically, in response to a program/erase count hitting a threshold, or the like, the hit count module 304 and/or the garbage collection module 306 may scan or otherwise process metadata for each block or other region of the non-volatile memory 122, comparing hit counts and/or valid counts in order to select a block or other region for a storage capacity recovery operation.

In certain embodiments, the hit count module 304 and/or the garbage collection module 306 may determine an intersection of a group of blocks with hit counts above a threshold and a group of blocks with valid counts below a threshold (e.g., in order to balance the benefits of lower write amplification for low valid counts and of faster garbage collection with high hit counts). Using the intersection, in various embodiments, the garbage collection module 306 may select the block or other region with the highest hit count from the intersection (e.g., to optimize speed while still limiting write amplification), may select the block or other region with the lowest valid count (e.g., to minimize write amplification while still increasing garbage collection speed), or the like. In this manner, in certain embodiments, the garbage collection module 306 does not necessarily select the block with the globally highest hit count and/or lowest valid count, but balances hit count and valid count.

For example, in one embodiment, the garbage collection module 306 selects a block or other region in response to the block or other region having a lowest amount of valid data out of a group of blocks or other regions selected as having both less than a threshold amount of valid data (e.g., a valid count below a threshold) and more than a threshold number of mappings likely to be stored in the volatile memory (e.g., a hit count above a threshold). In a further example, the garbage collection module 306 selects a block or other region in response to the block or other region having a highest number of mappings likely to be stored in the volatile memory (e.g., a highest hit count) out of a group of blocks or other regions selected as having both less than a threshold amount of valid data (e.g., a valid count below a threshold) and more than a threshold number of mappings likely to be stored in the volatile memory (e.g., a hit count above a threshold).

In one embodiment, if multiple blocks or other regions have the same or similar minimum valid count, the garbage collection module 306 may select a block from that group that has the highest hit count. In a further embodiment, the hit count module 304 and/or the garbage collection module 306 may determine a largest group of blocks or other regions that have about the same amount of valid data (e.g., a valid count within a predetermined valid data range of each other), and may select the block or other region from that group that has the highest hit count (e.g., the highest number of blocks or other regions likely to be stored in volatile memory for a storage capacity recovery operation). For example, in embodiments where all or most blocks or other regions have a similar valid count (e.g., due to wear leveling or the like), the garbage collection module 306 may select the block or other region with the highest hit count.

In embodiments where the garbage collection module 306 wear levels the blocks or other regions of the non-volatile memory 122 (e.g., based on usage rates, based on program/erase counts, or the like), the garbage collection module 306 select a block or other region for a storage capacity recovery operation that is least frequently used, least recently used, or the like, and may copy the data to a most frequently used block, most recently used block, or the like. In such a wear leveling embodiment, for example, in response to a plurality of the blocks or other regions (e.g., some, most, all, or the like) having an amount of valid data (e.g., a valid count) above a threshold and a number of mappings likely to be stored in volatile memory (e.g., a hit count) below a threshold, the garbage collection module 306 may select a block or other region that is least frequently used, least recently used, or the like.

In a further embodiment, in response to a plurality of the blocks or other regions (e.g., some, most, all, or the like) having an amount of valid data (e.g., a valid count) above a threshold and a number of mappings likely to be stored in volatile memory (e.g., a hit count) below a threshold, the garbage collection module 306 may write invalid data with the valid data to the different block or other region (e.g., without determining which data is valid or invalid, or the like). Copying both valid and invalid data to a new block when valid counts are substantially universally high and hit counts are substantially universally low (e.g., for workloads of random data that are seldom or never rewritten for long periods, or the like), in some embodiments, may improve performance of the storage capacity recovery operation by eliminating the scan of the logical-to-physical mapping structure and translation of the logical addresses to physical addresses, loading mappings from the non-volatile memory 122 into volatile memory, or the like.

FIG. 4 depicts one embodiment of a logical-to-physical mapping structure 400, a logical address space 420, and a sequential, log-based, append-only writing structure 440. The logical-to-physical mapping structure 400, in one embodiment, may be maintained by the maintenance component 150, the mapping module 302, or the like to map LBAs or other logical addresses to physical locations on the non-volatile memory 122. The logical-to-physical mapping structure 400 may be for all data stored on the non-volatile memory device 120, may be for a snapshot, subset of data, or the like.

The logical-to-physical mapping structure 400, in the depicted embodiment, is a B-tree with several entries. In the depicted embodiment, the nodes of the logical-to-physical mapping structure 400 include direct references to physical locations in the non-volatile memory 122. In other embodiments, the logical-to-physical mapping structure 400 may include links that map to entries in a reverse map, or the like. The logical-to-physical mapping structure 400, in various embodiments, may be used either with or without a reverse map. In other embodiments, the references in the logical-to-physical mapping structure 400 may include alpha-numerical characters, hexadecimal characters, pointers, links, or the like.

The logical-to-physical mapping structure 400, in the depicted embodiment, includes a plurality of nodes. Each node, in the depicted embodiment, is capable of storing two entries. In other embodiments, each node may be capable of storing a single entry, a greater number of entries, the number of entries at each level may change as the logical-to-physical mapping structure 400 grows or shrinks through use, or the like.

Each entry, in the depicted embodiment, maps a variable length range of LBAs of the non-volatile memory device 120 to a physical location in the non-volatile memory medium 122 of the non-volatile memory device 120. Further, while variable length ranges of LBAs, in the depicted embodiment, are represented by a starting address and an ending address, in other embodiments, a variable length range of LBAs may be represented by a starting address and a length, or the like. In one embodiment, the capital letters 'A' through 'M' represent a logical or physical erase block (e.g., a garbage collection block) in the physical non-volatile memory 122 of the non-volatile memory device 120 that stores the data of the corresponding range of LBAs. In other embodiments, the capital letters may represent other physical addresses or locations of the non-volatile memory device 120. In the depicted embodiment, the capital letters 'A' through 'M' are also depicted in the log-based writing structure 440 which represents the physical non-volatile memory 122 of the non-volatile memory device 120.

In the depicted embodiment, membership and/or presence in the logical-to-physical mapping structure 400 denotes membership and/or storage in the non-volatile memory device 120. In another embodiment, an entry may further include an indicator of whether the non-volatile memory device 120 stores data corresponding to a logical block within the range of LBAs, data of a reverse map, and/or other data, a valid indicator, or the like.

In the depicted embodiment, the root node 407 includes entries 402, 404 with noncontiguous ranges of LBAs. A "hole" exists at LBA "208" between the two entries 402, 404 of the root node. In one embodiment, a "hole" indicates that the non-volatile memory device 120 does not store data corresponding to one or more LBAs corresponding to the "hole." In one embodiment, the non-volatile memory device 120 supports block I/O requests (read, write, trim, etc.) with multiple contiguous and/or noncontiguous ranges of LBAs (i.e. ranges that include one or more "holes" in them). A "hole," in one embodiment, may be the result of a single block I/O request with two or more noncontiguous ranges of LBAs. In a further embodiment, a "hole" may be the result of several different block I/O requests with LBA ranges bordering the "hole."

In the depicted embodiment, similar "holes" or noncontiguous ranges of LBAs exist between the entries 406, 407 of the node 413, between the entries 409, 411 of the left child node of the node 413, between entries 413, 415 of the node 417, and between entries of the node 417. In one embodiment, similar "holes" may also exist between entries in parent nodes and child nodes. For example, in the depicted embodiment, a "hole" of LBAs "060-071" exists between the left entry 406 of the node 413 and the right entry 411 of the left child node of the node 413.

The "hole" at LBA "003," in the depicted embodiment, can also be seen in the logical address space 420 of the non-volatile memory device 120 at logical address "003" 430. The hash marks at LBA "003" 440 represent an empty location, or a location for which the non-volatile memory device 120 does not store data. The "hole" at LBA 434 in the logical address space 420, is due to one or more block I/O requests with noncontiguous ranges, a trim or other deallocation command to the non-volatile memory device 120, or the like. The logical-to-physical mapping structure 400 supports "holes," noncontiguous ranges of LBAs, and the like due to the sparse and/or thinly provisioned nature of the logical address space 420.

The logical address space 420 of the non-volatile memory device 120, in the depicted embodiment, is sparse and/or thinly provisioned, and is larger than the physical storage capacity and corresponding storage device address space of the non-volatile memory device 120. In the depicted embodiment, the non-volatile memory device 120 has a 64 bit logical address space 420 beginning at logical address "0" 422 and extending to logical address "264-1" 426. Because the physical address space corresponds to only a subset of the logical address space 420 of the non-volatile memory device 120, the rest of the logical address space 420 may be allocated, mapped, and used for other functions of the non-volatile memory device 120.

The sequential, log-based, append-only writing structure 440, in the depicted embodiment, is a logical representation of the physical non-volatile memory 122 of the non-volatile memory device 120. In certain embodiments, the non-volatile memory device 120 stores data sequentially, appending data to the log-based writing structure 440 at one or more append points 444. The non-volatile memory device 120, in a further embodiment, uses a storage capacity recovery operation, as described above with regard to the garbage collection module 306, that re-uses blocks of the non-volatile memory 122 storing data for deallocated/un-used/invalidated logical addresses (e.g., invalid data). Blocks of the non-volatile memory 122 storing data for deallocated/unused/invalidated logical addresses, in the depicted embodiment, are added to an available storage pool 446 for the non-volatile memory device 120. By clearing invalid data from the non-volatile memory device 120, as described above, and adding the physical storage capacity corresponding to the cleared data back to the available storage pool 446, in one embodiment, the log-based writing structure 440 is cyclic, ring-like, and has a theoretically infinite logical capacity.

In the depicted embodiment, the append point 444 progresses around the log-based, append-only writing structure 440 in a circular pattern 442. In one embodiment, the circular pattern 442 wear balances the non-volatile memory 122, increasing a usable life of the non-volatile memory 122. In the depicted embodiment, the garbage collection module 306 has marked several blocks 448, 450, 452, 454 as invalid, represented by an "X" marking on the blocks 448, 450, 452, 454. The garbage collection module 306, in one embodiment, will recover the physical storage capacity of the invalid blocks 448, 450, 452, 454 and add the recovered capacity to the available storage pool 446. In the depicted embodiment, modified versions of the blocks 448, 450, 452, 454 have been appended to the log-based writing structure 440 as new blocks 456, 458, 460, 462 in a read, modify, write operation or the like, allowing the original blocks 448, 450, 452, 454 to be recovered.

Figure 5:
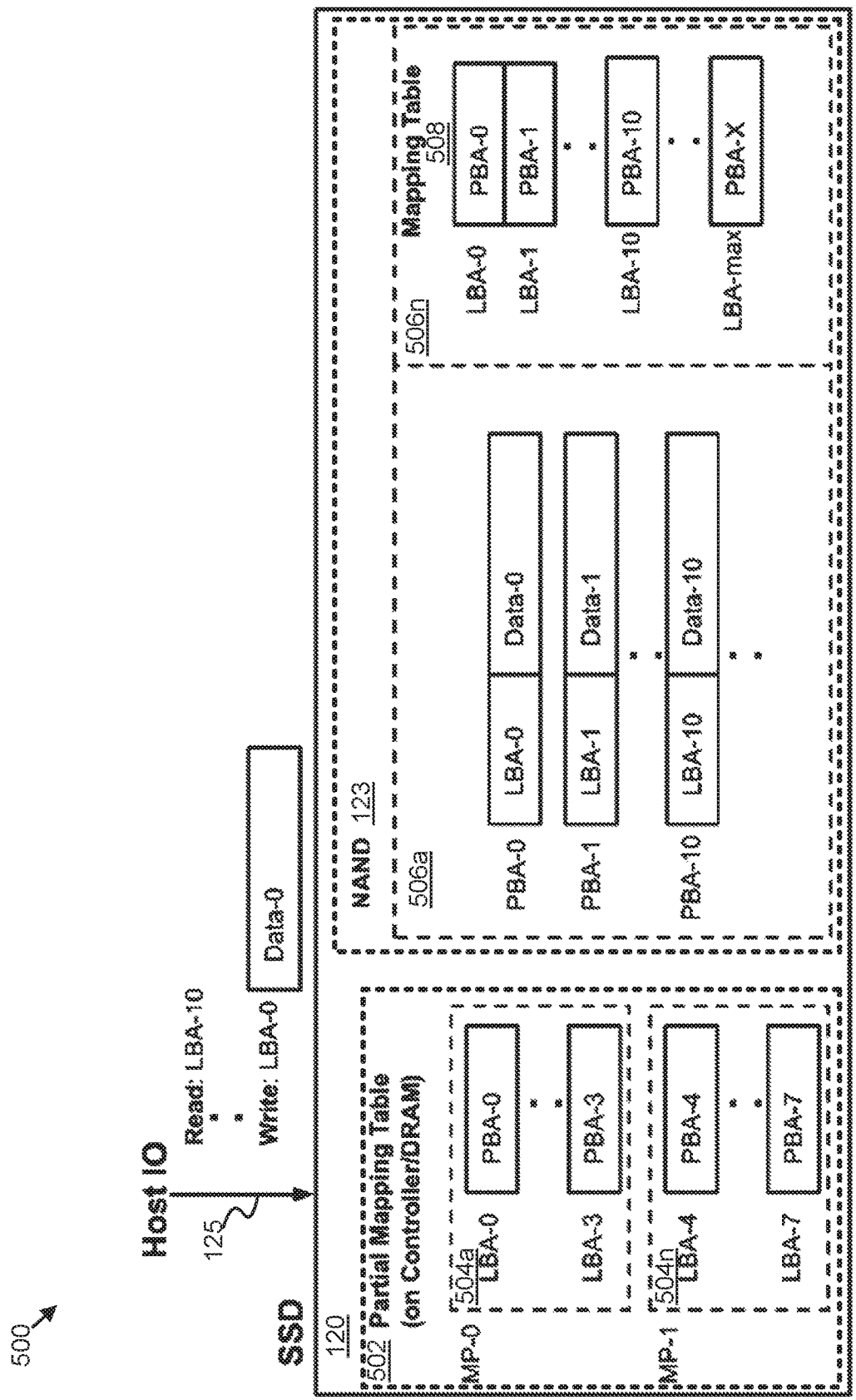
FIG. 5 is a schematic block diagram illustrating one embodiment of a system for source selection for storage capacity recovery.

FIG. 5 depicts one embodiment of a system 500 for source selection for storage capacity recovery. In the depicted embodiment, the system 500 includes a non-volatile memory device 120 comprising a volatile memory 502 and a plurality of non-volatile memory elements 123.

The volatile memory 502, in certain embodiments, may be disposed on and/or be in communication with a device controller 126 for the non-volatile memory device 120. The volatile memory 502 stores mapping pages 504*a-n* or other portions of a logical-to-physical mapping table 508 (e.g., as a cache, a partial logical-to-physical mapping table, or the like). Each mapping page 504*a-n* includes a plurality of entries mapping logical block addresses to physical block addresses in the non-volatile memory elements 123.

The non-volatile memory elements 123 store data in garbage collection blocks 506*a-n* at physical block addresses mapped by the mapping table 508. One of the garbage collection blocks 506*n* stores the mapping table 508, from which mapping pages 504*a-n* may be retrieved for use and stored in the volatile memory 502.

In the depicted embodiment, by way of example, each mapping page 504*a-n* includes four entries, such as LBA-0 to LBA-3 in mapping page 504*a*. In the example, the host computing device 110 may issue a write command at LBA-0 with Data-0, written to location PBA-0 in a first garbage collection block 506*a*, mapped by an entry of (LBA-0, PBA-0) in mapping page 504*a*. An indicator of the logical address LBA-0 is also stored as metadata with Data-0 of the write command at location PBA-0 in the first garbage collection block 506*a*.

Subsequently, in the example, the host computing device 110 may issue a read request for LBA-10. However, the memory page that includes an entry for LBA-10 is not cached in volatile memory 502. The device controller 126 and/or the mapping module 302 may therefore read out the mapping page including the entry for LBA-10 (e.g., MP-2 with entries LBA-8 to LBA-11) from the mapping table 508 in the garbage collection block 506*n*, load it into the volatile memory 502, access the entry for LBA-10 to get the mapping of LBA-10 to PBA-10, and read out Data-10 from physical location PBA-10 in the first garbage collection block 506*a* to satisfy the read request.

Figure 6:
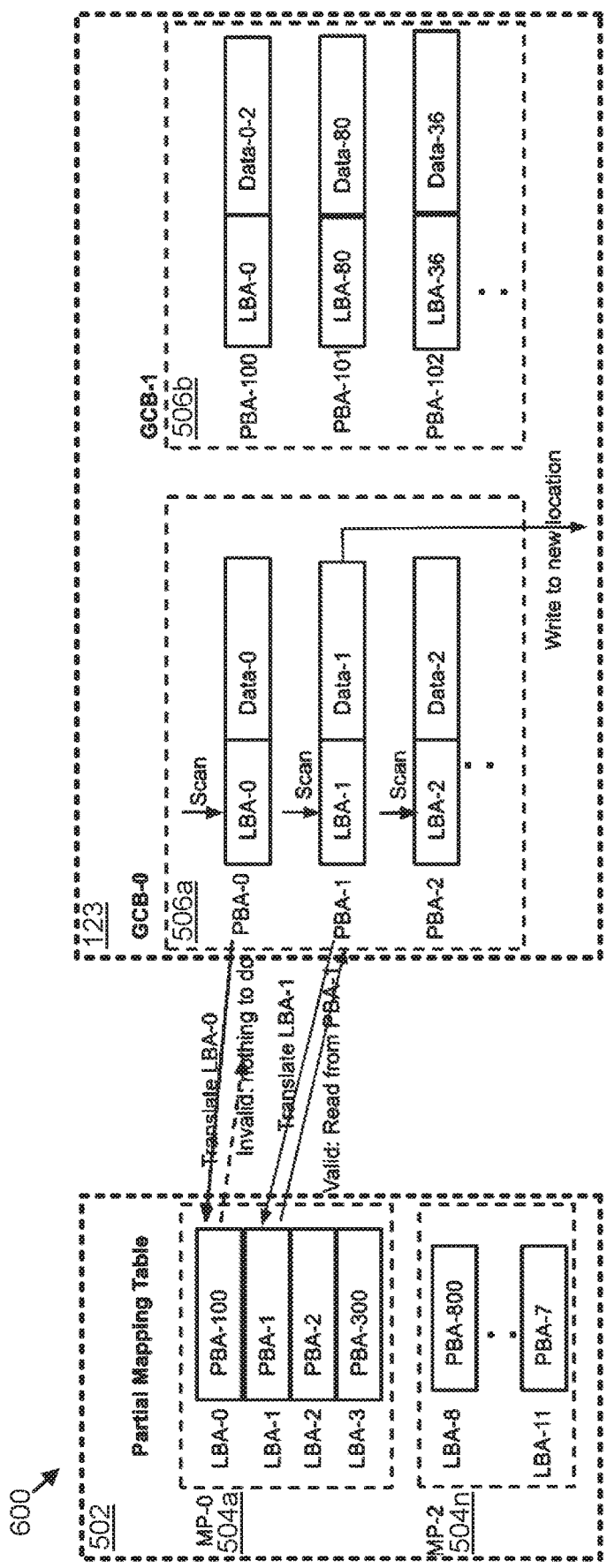
FIG. 6 is a schematic block diagram illustrating a further embodiment of a system for source selection for storage capacity recovery.

FIG. 6 depicts one embodiment of a system 600 for source selection for storage capacity recovery. The system 600, in some embodiments, may be substantially similar to the system 500 described above with regard to FIG. 5.

In certain embodiments, a write command from the host computing device 110 may invalidate an old copy of data stored in a previous written location in a garbage collection block 506 of a non-volatile memory element 123. For example, in the depicted embodiment, LBA-0's data stored in a first garbage collection block 506*a* has been updated from Data-0 to Data-0-2 stored in a second garbage collection block 506*b*, at physical block address PBA-100. The device controller 102 and/or the mapping module 302 may update a corresponding mapping entry in the first mapping page 504*a* from (LBA-0, PBA-0) to (LBA-0, PBA-100), thereby invalidating Data-0 at PBA-0 in the first garbage collection block 506*a*. Invalid data still occupies the first garbage collection block 506*a* at PBA-0 until the garbage collection module 306 performs a garbage collection operation for the first garbage collection block 506*a*.

When the garbage collection module 306 selects the first garbage collection block 506*a* as the source block for a garbage collection operation or other storage capacity recovery operation, the garbage collection module 306 moves valid data such as Data-1 at location PBA-1 to a different garbage collection block 506 and leaves invalid data such as Data-0 at location PBA-0 behind (e.g., to be erased or otherwise cleared from the first garbage collection block 506*a*). After the garbage collection module 306 moves the valid data from the first garbage collection block 506*a* to a different garbage collection block 506, the garbage collection module 306 may erase the first garbage collection block 506*a* so that it may be reused to accommodate new host writes, or the like.

The hit count module 304 may keep a valid count for each garbage collection block 506, as described above. However, a valid count, in certain embodiments, does not indicate which data is valid. The garbage collection module 306, in order to determine which data is valid, may perform a scan of the logical addresses stored in the first garbage collection block 506*a*, and may check the mappings in the mapping pages 504*a-n* in the volatile memory 502 for each logical address scanned, loading missing mapping pages 504 from the non-volatile memory element 123 in response to determining that a mapping for a logical address read from the first garbage collection block 506a is not stored in the volatile memory 502. If the logical address is still mapped to the same location in the first garbage collection block 506a then the garbage collection module 306 determines that the associated data is still valid, but if the logical address is mapped to a different location (e.g., in a different garbage collection block 506) then the associated data is invalid.

In the depicted embodiment, for example, the garbage collection module 306 scans the first garbage collection block 506a and reads logical address LBA-0 from physical address PBA-0. However, the first mapping page 504a translates logical address LBA-0 to physical address PBA-100, so Data-0 at location PBA-0 in the first garbage collection block 506a is invalid and may be left for erasure. The garbage collection module 306 may continue the scan to physical address PBA-1 and may find Data-1 valid since the first mapping page 504a still maps LBA-1 to PBA-1, so the garbage collection module 306 may read Data-1 from PBA-1 and write it to a different garbage collection block 506 (e.g., a target block) and continue the scan.

Similar to a cache miss for a host read request, the garbage collection module 306 may encounter a cache miss during a scan if a mapping for a logical address is not stored in the volatile memory 502. For example, if the garbage collection module 306 scans physical address PBA-101 of the second garbage collection block 506b and reads the logical address LBA-80, the garbage collection module 306 may encounter a cache miss since a mapping for LBA-80 is not stored in the volatile memory 502. The mapping module 302 may read a mapping page 504 that includes a mapping for LBA-80 from the non-volatile memory element 123 and load it into volatile memory 502 for the garbage collection module 306 to complete the scan. Due to this process of cache misses triggering reads from the non-volatile memory element 123, selecting a source garbage collection block 506 with a higher hit count (e.g., fewer cache misses) may allow for faster garbage collection operations.

In the depicted example embodiment, assuming each garbage collection block 506 has only the depicted three physical blocks, the hit count for the first garbage collection block 506a may be three, since mappings for all three of LBA-0, LBA-1, and LBA-2 are stored in the volatile memory 502 and the hit count for the second garbage collection block 506b may be one, since only the mapping for LBA-0 is stored in the volatile memory 502. Since the hit count for the first garbage collection block 506a is higher than the hit count for the second garbage collection block 506b, a garbage collection operation for the first garbage collection block 506a may be faster than a garbage collection operation for the second garbage collection block 506b.

Figure 7:
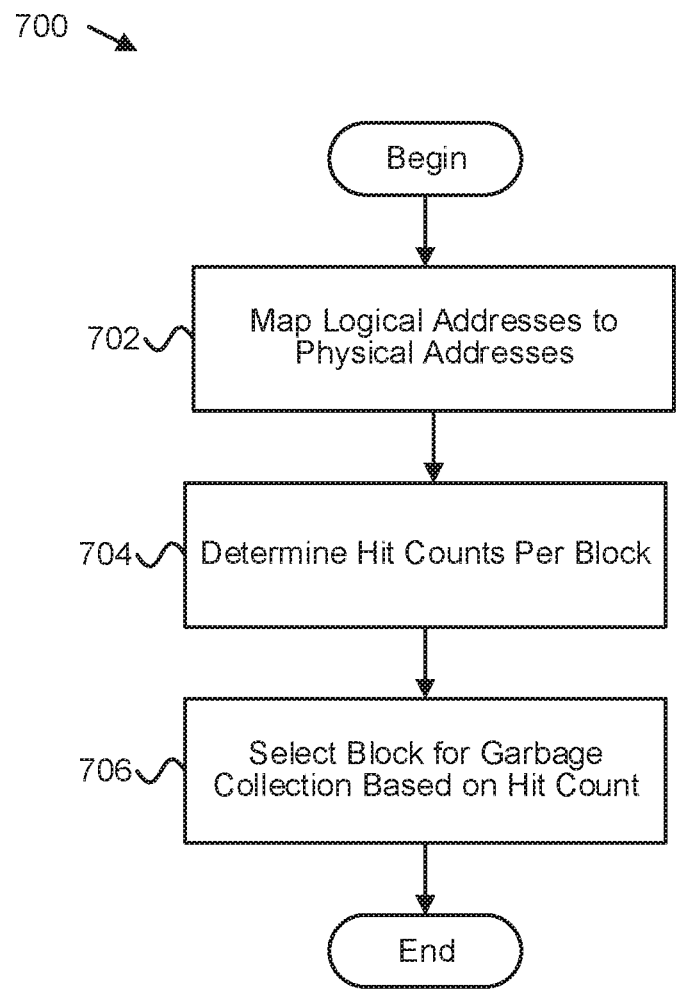
FIG. 7 is a flow chart illustrating one embodiment of a method for source selection for storage capacity recovery.

FIG. 7 depicts one embodiment of a method 700 for source selection for storage capacity recovery. The method 700 begins and the mapping module 302 maps 702 logical addresses for stored data to physical addresses of the stored data (e.g., in the non-volatile memory 122) using a logical-to-physical mapping structure stored partially in volatile memory 502 and partially in the non-volatile memory 122.

The hit count module 304 determines 704, per block of the non-volatile memory 122, a hit count (e.g., estimating a number of mappings of a logical-to-physical mapping structure likely to be stored in the volatile memory 502 for a garbage collection operation). The garbage collection module 306 selects one of the blocks of the non-volatile memory 122 for a garbage collection operation based at least partially on the determined 704 hit count for the block and the method 700 ends.

Figure 8:
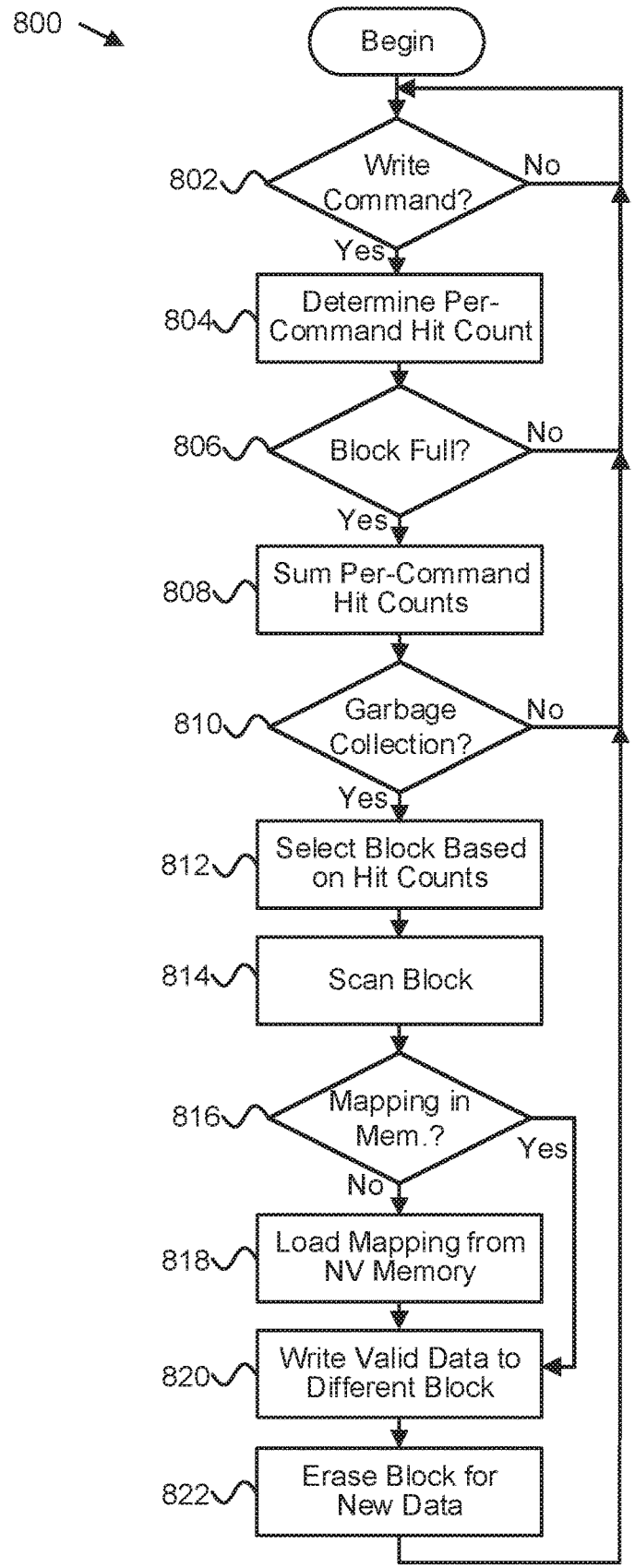
FIG. 8 is a flow chart illustrating a further embodiment of a method for source selection for storage capacity recovery.

FIG. 8 depicts one embodiment of a method 800 for source selection for storage capacity recovery. The method 800 begins and the mapping module 302 determines 802 if a write command has been received. If the mapping module 302 determines 802 that a write command has been received, the mapping module 302 creates one or more logical-to-physical mappings for data of the write command and the hit count module 304 determines 804 a per-command hit count for the write command.

The hit count module 304 determines 806 if the block to which data of the write command was written is full. In response to the hit count module 304 determining 806 that the block is full, the hit count module 304 sums 808 the per-command hit counts for the block into a single hit count for the block.

The garbage collection module 306 determines 810 if a garbage collection operation should be performed (e.g., periodically, based on a program/erase count, in response to a remaining capacity falling below a threshold, or the like). If the garbage collection module 306 determines 810 that a garbage collection operation should be performed, the garbage collection module 306 selects 812 a block of the non-volatile memory 122 on which to perform the garbage collection operation based at least partially on the hit count.

The garbage collection module 306 scans 814 metadata of the selected 812 block for logical addresses and checks cached logical-to-physical mappings in volatile memory for the logical addresses. In response to determining 816 that a mapping for one of the logical addresses is not in the volatile memory (e.g., a cache miss), the mapping module 302 loads 818 a mapping page including the missing mapping from the non-volatile memory 122 and into volatile memory so that the garbage collection module 306 may determine which data in the block is valid.

The garbage collection module 306 writes 820 the valid data from the selected 812 block to a different block of the non-volatile memory 122. The garbage collection module 306 erases 822 the selected 812 block so that it can be used for new data from subsequent write commands and the method 800 continues.

A means for periodically receiving refresh commands and/or triggers at a non-volatile memory element 123 over a bus 125, in various embodiments, may include an electrical pin, pad, or other contact; a maintenance component 150; an interface circuit 502; a maintenance circuit 508; a non-volatile memory element 123, a non-volatile memory device 120, a memory device controller 126; an on-die controller 220; a state machine 222; an integrated circuit device; an FPGA; an ASIC; other logic hardware; and/or other executable code stored on a computer readable storage medium. Other embodiments may include similar and/or equivalent means for periodically receiving refresh commands and/or triggers at a non-volatile memory element 123 over a bus 125.

A means for paging logical-to-physical mappings 504a-n from a volatile memory 502 to a non-volatile memory 122, in various embodiments, may include a maintenance component 150, a mapping module 302, a volatile memory 502, a bus 125, 127, a device controller 126, an on-die controller 220, a device driver 128, a processor 111, other logic hardware, and/or other executable code stored on a computer readable storage medium. Other embodiments may include similar and/or equivalent means for paging logical-to-physical mappings 504 from a volatile memory 502 to a non-volatile memory 122.

A means for ranking blocks 506a-n of a non-volatile memory 122 at least partially based on how many logical-to-physical mappings 504a-n for the blocks 506a-n are stored in volatile memory 502, in various embodiments, may include a maintenance component 150, a hit count module 304, a device controller 126, a device driver 128, a processor 111, other logic hardware, and/or other executable code stored on a computer readable storage medium. Other embodiments may include similar and/or equivalent means for ranking blocks 506a-n of a non-volatile memory 122 at least partially based on how many logical-to-physical mappings 504a-n for the blocks 506a-n are stored in volatile memory 502.

A means for performing a storage capacity recovery operation on a block 506 of a non-volatile memory 122 selected based at least partially on a ranking of blocks 506a-n, in various embodiments, may include a maintenance component 150, a garbage collection module 306, a device controller 126, an on-die controller 220, a device driver 128, a processor 111, other logic hardware, and/or other executable code stored on a computer readable storage medium. Other embodiments may include similar and/or equivalent means for performing a storage capacity recovery operation on a block 506 of a non-volatile memory 122.

A means for tracking, per block 506a-n of a non-volatile memory 122, how many logical-to-physical mappings for the blocks 506a-n are likely to be stored in volatile memory 502, in various embodiments, may include a maintenance component 150, a hit count module 304, a device controller 126, a device driver 128, a processor 111, other logic hardware, and/or other executable code stored on a computer readable storage medium. Other embodiments may include similar and/or equivalent means for tracking, per block 506a-n of a non-volatile memory 122, how many logical-to-physical mappings for the blocks 506a-n are likely to be stored in volatile memory 502.

A means for determining which data of a block 506 is valid based on logical-to-physical mappings 504, 508, in various embodiments, may include a maintenance component 150, a garbage collection module 306, a device controller 126, a device driver 128, a processor 111, other logic hardware, and/or other executable code stored on a computer readable storage medium. Other embodiments may include similar and/or equivalent means for determining which data of a block 506 is valid based on logical-to-physical mappings 504, 508.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A system comprising:
a non-volatile memory device comprising:
volatile memory;
a non-volatile memory; and
a controller, wherein the controller is configured to:
map logical addresses for stored data to physical addresses of the stored data in the non-volatile memory using a logical-to-physical mapping structure stored partially in the volatile memory and at least partially in the non-volatile memory; and
perform a storage capacity recovery operation for a region of the non-volatile memory, the region selected based on the region having a lowest amount of valid data out of a group of regions selected as having both less than a threshold amount of valid data and more than a threshold number of mappings that are estimated to be stored in the volatile memory for the storage capacity recovery operation, the estimate determined based on a tracked hit count and a tracked valid data count for the selected region.

2. The system of claim 1, wherein the number of mappings for the region that are estimated to be stored in the volatile memory for the storage capacity recovery operation is determined on a per-command basis as data is written to the region.

3. The system of claim 2, wherein the per-command determination for a command is based on a number of logical addresses written by the command and on a number of logical address mappings stored per page of the logical-to-physical mapping structure.

4. The system of claim 1, wherein the storage capacity recovery operation for the region comprises writing valid data from the region to a different region and erasing the region.

5. The system of claim 4, wherein the controller is further configured to determine the valid data from the region based on entries in the logical-to-physical mapping structure such that performing the storage capacity recovery operation for the region is faster than performing a storage capacity recovery operation on another region with a lower number of mappings estimated to be stored in the volatile memory than the region.

6. The system of claim 4, wherein the region is further selected based partially on a size of the valid data from the region.

7. The system of claim 6, wherein the region is selected for the storage capacity recovery operation in response to the region having a highest number of mappings estimated to be stored in the volatile memory for the storage capacity recovery operation out of regions having a lowest amount of valid data.

8. The system of claim 6, wherein the region is selected for the storage capacity recovery operation in response to the region having a highest number of mappings estimated to be stored in the volatile memory for the storage capacity recovery operation out of a group of regions selected as having both less than a threshold amount of valid data and more than a threshold number of mappings estimated to be stored in the volatile memory for the storage capacity recovery operation.

9. The system of claim 6, wherein the region is selected for the storage capacity recovery operation in response to the region having a highest number of mappings estimated to be stored in the volatile memory for the storage capacity recovery operation out of a largest group of regions having an amount of valid data within a predetermined valid data range of each other.

10. The system of claim 4, wherein the storage capacity recovery operation for the region further comprises writing invalid data from the region to the different region with the valid data.

11. The system of claim 10, wherein the region is selected for the storage capacity recovery operation in response to the region being a least frequently used region and the different region comprises a most frequently used region.

12. The system of claim 10, wherein the invalid data is written with the valid data in response to a plurality of regions of the non-volatile memory having an amount of valid data above a threshold and a number of mappings estimated to be stored in the volatile memory for the storage capacity recovery operation below a threshold.

13. An apparatus comprising:
a mapping module configured to map logical addresses for stored data to physical addresses of the stored data in a non-volatile memory using a logical-to-physical mapping structure stored partially in volatile memory and at least partially in the non-volatile memory;
a hit count module configured to track, per block of the non-volatile memory, a hit count and a valid data count that are used to estimate a number of mappings of the logical-to-physical mapping structure estimated to be stored in the volatile memory for a garbage collection operation and indicate an amount of valid data in a region of the volatile memory; and
a garbage collection module configured to perform a garbage collection operation for one of the blocks of the non-volatile memory that is selected in response to having a lowest amount of valid data out of a group of blocks selected as having both a valid count that is less than a threshold amount of valid data and a hit count that is more than a threshold number of mappings estimated to be stored in the volatile memory for the garbage collection operation.

14. The apparatus of claim 13, wherein the garbage collection operation comprises writing valid data from the block to a different block and erasing the block, and the garbage collection module is further configured to determine the valid data from the block based on entries in the logical-to-physical mapping structure such that performing the garbage collection operation for the block is faster than performing a garbage collection operation on another block with a lower hit count than the block.

15. The apparatus of claim 13, wherein the garbage collection module is further configured to select the block based partially on a size of valid data from the block and the block is selected for the garbage collection operation in response to one or more of:
the block having a highest hit count out of blocks having a lowest amount of valid data;
the block having a lowest amount of valid data out of a group of blocks selected as having both less than a threshold amount of valid data and more than a threshold hit count;
the block having a highest hit count out of a group of blocks selected as having both less than a threshold amount of valid data and more than a threshold hit count; and
the block having a highest hit count out of a largest group of blocks having an amount of valid data within a predetermined valid data range of each other.

16. The apparatus of claim 13, wherein the mapping module, the hit count module, and the garbage collection module comprise one or more of logic hardware and executable program code stored by a non-transitory computer readable storage medium.

17. An apparatus comprising:
means for paging logical-to-physical mappings from a volatile memory to a non-volatile memory;
means for ranking blocks of the non-volatile memory at least partially based on how many of the logical-to-physical mappings for the blocks are estimated to be stored in the volatile memory; and
means for performing a storage capacity recovery operation on a block of the blocks of the non-volatile memory that is selected based at least partially on the ranking of the blocks and in response to the block having a lowest amount of valid data out of a group of blocks selected as having both less than a threshold amount of valid data and more than a threshold number of mappings estimated to be stored in the volatile memory for the storage capacity recovery operation, the estimate determined based on a tracked hit count and a tracked valid data count for the selected region.

18. The apparatus of claim 17, further comprising means for tracking, per block of the non-volatile memory, how many of the logical-to-physical mappings for the blocks are estimated to be stored in the volatile memory.

19. The apparatus of claim 17, further comprising means for determining which data of the block is valid based on the logical-to-physical mappings such that performing the storage capacity recovery operation for the block is faster than performing a storage capacity recovery operation on another block with a lower number of mappings estimated to be stored in the volatile memory than the block.

* * * * *